United States Patent [19]

Ogura et al.

[11] Patent Number: 4,670,799
[45] Date of Patent: Jun. 2, 1987

[54] ERASING APPARATUS

[75] Inventors: Tokihiko Ogura, Kanagawa; Shigeru Hashimoto, Tokyo, both of Japan

[73] Assignee: Canon Kabushiki Kaisha, Tokyo, Japan

[21] Appl. No.: 576,034

[22] Filed: Feb. 1, 1984

[30] Foreign Application Priority Data

Feb. 2, 1983 [JP] Japan .................................. 58-15821

[51] Int. Cl.⁴ ............................................... G11B 5/03
[52] U.S. Cl. ..................................................... 360/66
[58] Field of Search ..................................... 360/66, 73

[56] References Cited

U.S. PATENT DOCUMENTS

| 2,535,481 | 12/1950 | Begun | 360/66 |
| 2,704,790 | 3/1955 | Gratian | 360/66 |
| 2,898,408 | 8/1959 | Folse | 360/66 |
| 3,038,036 | 6/1962 | Young et al. | 360/66 |
| 3,156,784 | 11/1964 | Kump | 360/66 |
| 3,449,529 | 6/1969 | Camras | 360/66 |

OTHER PUBLICATIONS

"Erasure of Magnetic Tape" by John G. McKnight, Journal of Audio Engineering Soc., 7/63, vol. #3.

Primary Examiner—Vincent P. Canney
Attorney, Agent, or Firm—Toren, McGeady and Goldberg

[57] ABSTRACT

The disclosed erasing apparatus is capable of erasing a signal recorded on a magnetic recording medium from individual recording tracks one by one over an erasing width wider than the width of each recording track. A magnetic head receives an erasing signal from a generating circuit that generates an erasing signal including a sustained oscillation of low frequency outside of the frequency band of a recorded or reproduced signal and a subsequent attenuating oscillation of a frequency higher than the frequency of the sustained oscillation.

23 Claims, 9 Drawing Figures

ERASING APPARATUS

BACKGROUND OF THE INVENTION

1. Field of the Invention

The present invention relates to an erasing apparatus and more particularly to an erasing apparatus which erases a signal recorded on a magnetic recording medium from each individual recording track formed on the medium.

2. Description of the Prior Art

Erasing apparatuses exist for magnetic recording reproducing devices of the kind arranged to record on a rotary type magnetic disc or drum by forming annular recording tracks thereon. Such erasing apparatuses are capable of erasing the recorded signal from each individual recording track. These known devices include erasing apparatuses that use a recording or reproducing magnetic head or a magnetic head provided especially for erasing, and erase the recorded signal by applying an AC or DC erasing signal to the magnetic head. However, these erasing signal to the magnetic head. However, these erasing apparatuses have been unsatisfactory because of shortcomings, such as inadequate erasing efficiency, residual distortion after erasing, an excessively long time required for erasing a record from each recording track; and difficulty in erasing each recording track with a sufficient erasing width.

SUMMARY OF THE INVENTION

It is therefore a principal object of the present invention to provide a novel erasing apparatus which eliminates the shortcomings of the prior art apparatuses.

It is a more specific object of the invention to provide an erasing apparatus which is capable of efficiently erasing and satisfactorily removing residual distortion in a short period of time.

It is another object of the invention to provide an erasing apparatus which is capable of erasing a recording track more widely than the width of the track.

With these objects, an erasing apparatus embodying an aspect of the present invention as a preferred embodiment thereof comprises a magnetic head; an erasing signal generating circuit for generating an erasing signal including a sustained oscillation which is of low frequency outside of the frequency band of a recorded or reproduced signal and an attenuating oscillation which follows the sustained oscillation and is of frequency higher than the frequency thereof; and means for causing the magnetic head to produce a magnetic field by the erasing signal. In this embodiment, the above-stated attenuating oscillation either may be an oscillation of constant frequency or may be an oscillation of gradually increasing frequency.

Another embodiment of the present invention comprises a magnetic head; an erasing signal generating circuit for generating an erasing signal including a sustained oscillation which is of low frequency outside of the frequency band of a recorded or reproduced signal and an attenuating oscillation which follows the sustained oscillation and is of any desired frequency; means for causing the magnetic head to produce a magnetic field by the erasing signal; and means for causing the relative speed between the magnetic head and a recording medium to become lower during the period of the attenuating oscillation than during the period of the sustained oscillation. In this embodiment, the relative speed between the magnetic head and the recording medium during the attenuating oscillation period of the erasing signal may be either arranged to be constant or arranged to gradually decrease.

An inventor of the present invention has previously proposed, in U.S. patent application Ser. No. 560,413 filed Dec. 12, 1983, an erasing apparatus capable of efficiently erasing a signal recorded in recording tracks wider than the width of the recording track by supplying a magnetic head with an erasing signal which oscillates at a low frequency outside of the frequency band of the recorded or reproduced signal and includes a gradually attenuating oscillation. This previously proposed apparatus is improved by the apparatus according to the present invention in which either the frequency of the attenuating oscillation included in the above-stated erasing signal is arranged to be higher than that of a preceding sustained oscillation or the recorded wave length on the recording medium is arranged to be equivalently shortened so that the period of the attenuating oscillation can be further shortened and residual distortion can be removed within a shorter period of time.

Thus, according to the present invention, the magnetic head is operated in its high permeability region for erasing and an increased magnetic flux density is obtained, so that the erasing efficiency is improved and erasing can be accomplished in a short period of time. Since there is high magnetic flux leakage at the gap of the head due to the low frequency erasing signal, erasing over a sufficiently wide width can be accomplished even with some deviation of the position of the head from the recording track.

With either the frequency of the erasing signal during the attenuating oscillation period thereof arranged to be higher than the frequency thereof during the sustained oscillation period or with the recorded wave length arranged to become equivalently short, a period of time required for removal of the residual distortion becomes shorter than the period of time required in the case where the two frequencies or recorded wave lengths are arranged to be equal. Or, the erasing efficiency within the same erasing period of time can be further improved by the present invention. Further, arrangement to supply the erasing signal to a recording or reproducing coil likewise permits reduction in a residual noise and residual distortion. Therefore, such an arrangement permits simplification of the structural arrangement of the apparatus and extensive mechanical adjustment work thereon.

The above and further objects and features of the present invention will become apparent from the following detailed description of preferred embodiments thereof taken in conjunction with the accompanying drawings.

BRIEF DESCRIPTION OF THE DRAWINGS

The accompanying drawings show some preferred embodiments of the present invention. In these drawings.

DETAILED DESCRIPTION OF THE PREFERRED EMBODIMENTS

In accordance with the present invention, a signal recorded on a recording medium is erased by moving a magnetic head and the recording medium relative to each other and by having a magnetic field generated at the magnetic head by an erasing signal. In the specific examples of erasing apparatus embodying the present invention described below, the recording medium is a rotary magnetic disc; a recording or reproducing head is arranged also to serve as an erasing head; and an erasing signal is arranged to be supplied to the recording or reproducing head.

Figure 1A:
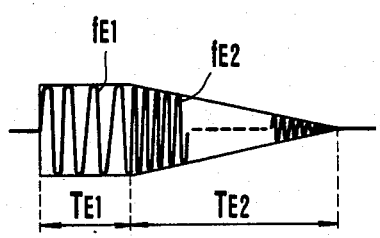
FIGS. 1(a) and 1(b) are wave form charts showing two examples of the erasing signal of a first embodiment of the invention.
Figure 1B:
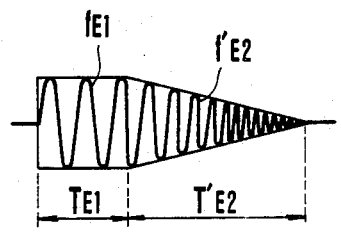
Figure 3:
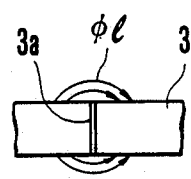
FIG. 3 is an illustration of a leakage flux obtained in the first and second embodiments.

FIGS. 1(a) and 1(b) show two examples of the erasing signal to be provided in the first embodiment of the present invention. In the example shown in FIG. 1(a), the erasing signal is composed of a sustained oscillation which preferably has a constant amplitude and an attenuating oscillation which follows the sustained oscillation. During the period TE1 of the sustained oscillation, the frequency fE1 of the erasing signal is constant and is of a low frequency which is outside of the frequency band of a recorded or reproduced signal. During the period TE2 of the attenuating oscillation the frequency fE2 of the erasing signal is constant and is higher than the frequency fE1. When this erasing signal is supplied, for example, to a recording or reproducing coil wound around a recording or reproducing magnetic head, a recording track to be erased on the recording medium such as a magnetic disc is magnetized to saturation during the sustained oscillation period TEL and thus a signal recorded in the recording track to be erased is erased by this magnetization. Following that, distortion of internal magnetization is removed by the attenuating oscillation having the frequency fE2 which is higher than the frequency fE1 of the sustained oscillation. The frequency fE1 of the sustained oscillation period TE1 of the erasing signal is a low frequency outside of the frequency band of the recorded or reproduced signal. In this case, if the frequency fE2 of the attenuating oscillation period TE2 is likewise arranged to be outside of the frequency band of the recorded or reproduced signal, a high permeability region of the magnetic head can be used. With the high permeability region used, magnetic flux density increases, so that erasing efficiency can be enhanced and the erasing action can be accomplished within a short period of time. Then, even if some erasing signal component remains, the amount of such signal component is negligible as a beat component which might be produced at the time of reproduction. Further, since the main function of the erasing signal during the attenuating oscillation period TE2 is to remove the distortion of internal magnetization, the frequency of the attenuating oscillation period TE2 does not have to be a low frequency outside of the frequency band of the recorded or reproduced signal. Further, as shown in FIG. 3, there is much of a leakage flux $\phi 1$ to the outside at a head gap 3a. Therefore, the erasing magnetic field produced by the low frequency signal during the sustained oscillation period TE1 is capable of erasing the original recording signal with sufficient erasing width to allow some positional deviation of the head relative to the track. Compared with the above-stated arrangement to have the frequency fE2 equal to the frequency fE1, the arrangement with the frequency fE2 higher than the frequency fE1 removes residual distortion in a shorter period of time. Conversely, if the length of erasing time is the same, the latter arrangement increases erasing efficiency.

A specific example of the numerical values of the erasing signal shown in FIG. 1(a) is as follows: Although these values on the erasing signal vary with the recording medium, the material from which the head is made, the number of turn of the winding of the head and the frequency band of the recorded or reproduced signal, let us assume that one field portion of a color video signal according to the NTSC color system is recorded in each of the concentric recording tracks on the magnetic disc; accordingly, the number of revolutions of the magnetic disc is 3600/min.; and erasing is accomplished for each individual recording track. Under that condition, the frequency fE1 of the erasing signal during the sustained oscillation period TE1 is preferably 0.5 to 5 KHz; the sustained oscillation period TE1 is 0.1 to 1 sec.; and the amplitude of the sustained oscillation is 30 to 40 mA when the period TE1 is 0.2 to 0.4 sec. The attenuating oscillation period TE2 is arranged to be 1 to 2 sec. when the frequency fE2 is equal to the frequency fE1 and to become shorter than that as the ratio of the frequency fE2 to the frequency fE1 increases. The frequency fE2 is higher than the frequency fE1 and there is no particular critical value within a limit which is allowed for the erasing signal and is determined by the material and the structural arrangement of the magnetic head, the material of the recording medium, etc.

In another example of the erasing signal which is shown in FIG. 1(b), the erasing signal consists of a sustained oscillation which is preferably of unvarying amplitude and has the above-stated frequency fE1 and an attenuating oscillation in which the frequency gradually increases. This change of frequency is arranged to continuously take place in the case of the drawing. However, the frequency change may be arranged to take place stepwise. Further, assuming that the frequency which gradually increases during the attenuating oscillation period T'E2 is comprehensively expressed or expressed on the average as f'E2, the frequency f'E2 may be either higher or lower tnan the above-stated frequency fE2. The erasing signal of FIG. 1(b) is capable of further shortening the time required for removal of residual distortion during the attenuating oscillation period T'E2 according to the manner in which the frequency f'E2 is allowed to increase as compared with the erasing signal of FIG. 1(a). In addition to that, the same advantage as that mentioned in the foregoing can be attained by the erasing signal of FIG. 1(b). A specific example of the numerical values of the erasing signal of FIG. 1(b) is similar to that related to the erasing signal of FIG. 1(a).

In the first embodiment, the erasing signal is arranged to have a higher frequency in the attenuating oscillation period TE2 than in the sustained oscillation period TE1 for the puspose of reduction in erasing time. In a second embodiment, the relative speed of the magnetic head and the recording medium is lowered in the attenuating oscillation period TE2 from that in the sustained oscillation period TE1 in such a way as to equivalently shorten the recorded wave length during the attenuating oscillation period.

Figure 2A:
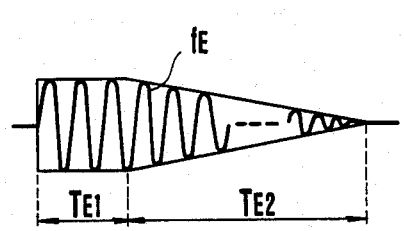
FIG. 2(a) is a wave form chart showing an example of the wave form of the erasing signal of a second embodiment of the invention.

FIG. 2(a) shows an example of the erasing signal wave form of the second embodiment. The frequency fE of the erasing signal in this example is lower frequency than the frequency band of the recorded or reproduced signal and remains unchanged throughout the sustained oscillation period TE1 and the attenuating oscillation period TE2. The erasing signal of the second embodiment of course may be arranged to have a higher frequency during the period TE2 than during the period TE1 or to have the frequency gradually increased during the period TE2. However, the following description relates to an arrangement where the frequency of the erasing signal is constant throughout the two periods shown in FIG. 2(a).

Figure 2B:
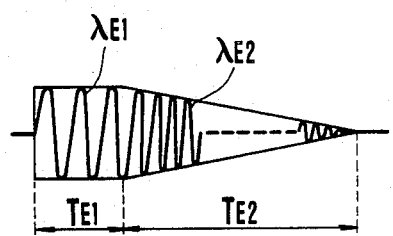
FIGS. 2(b) and 2(c) are wave form charts showing two examples of recorded wave length in the second embodiment of the invention.

FIG. 2(b) shows a case where the relative speed of the magnetic head and the recording medium is changed to a lower constant speed VE2 from a higher constant speed VE1 between the sustained oscillation period TE1 and the attenuated oscillation period TE2. As shown, in this case, the recorded wave length changes from $\lambda E1=VE1/fE$ to $\lambda E2=VE2/fE$. The recorded wave length $\lambda E2$ during the period TE2 similarly becomes shorter in the same manner as the signal wave form of FIG. 1(a) does in the first embodiment where the frequency fE2 of the erasing signal during the period TE2 becomes higher and the relative speed VE is arranged to be constant. Therefore, with the relative speed VE between the magnetic head and the recording medium during the period TE2 arranged to become lower, the high permeability region of the magnetic head can be advantageously used throughout the sustained oscillation period TE1 and the attenuating oscillation period TE2. Accordingly, the magnetic flux density increases throughout the both of the periods TE1 and ET2 and the erasing efficiency is enhanced to permit erasing within a short period of time. Further, since there is substantial magnetic flux leakage $\phi$1 to the outside of the head gap part 3a as shown in FIG. 3, the original recorded signal can be sufficiently widely erased to allow a certain degree of deviation in the position of the head. Compared with the above-stated case where the relative speed VE2 is arranged to be unchanged from the speed VE1, the arrangement of making the speed VE2 lower than the speed VE1 permits removal of residual distortion in a still shorter period of time and also further enhances the erasing efficiency within the same erasing time.

Figure 2C:
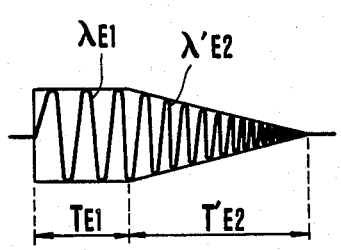

FIG. 2(c) shows a case where the recorded wave length is changed in the same manner as in the case of FIG. 2(b) with the exception of that the above-stated relative speed is gradually descreased during the attenuating oscillation period T'E2. In the drawing, the change of the relative speed and accordingly the change of the recorded wave length take place in a continuous manner. However, the change may be arranged to take place stepwise manner. Further, assuming that the relative speed which is gradually lowered is expressed comprehensively or in an averaged manner as V'E2, the speed V'E2 may be arranged to be either higher or lower than the above-stated speed VE2. In the case of FIG. 2(c), the recorded wave length $\lambda'E2=V'E2/fE$ is equivalently gradually shortened as the relative speed V'E2 changes. This affords the same advantageous effect as the case of FIG. 1(b) where the frequency f'E2 of the erasing signal during the period T'E2 is arranged to become gradually higher. Therefore, in accordance with the erasing method shown in FIG. 2(c), the length of time required in removing the residual distortion during the attenuating oscillation period T'E2 can be further shortened as compared with the erasing method shown in FIG. 2(b). Meanwhile, the above-stated advantage also can be attained in the same manner. Further, the recorded wave length can be equivalently further shortened by making the frequency of the erasing signal higher than fE, or higher than fE and at the same time gradually increasing either during the period TE2 or T'E2.

According to the present invention, the erasing signal may be arranged to include some signal component other than the sustained oscillation and the attenuating oscillation shown in FIGS. 1 and 2.

Figure 4:
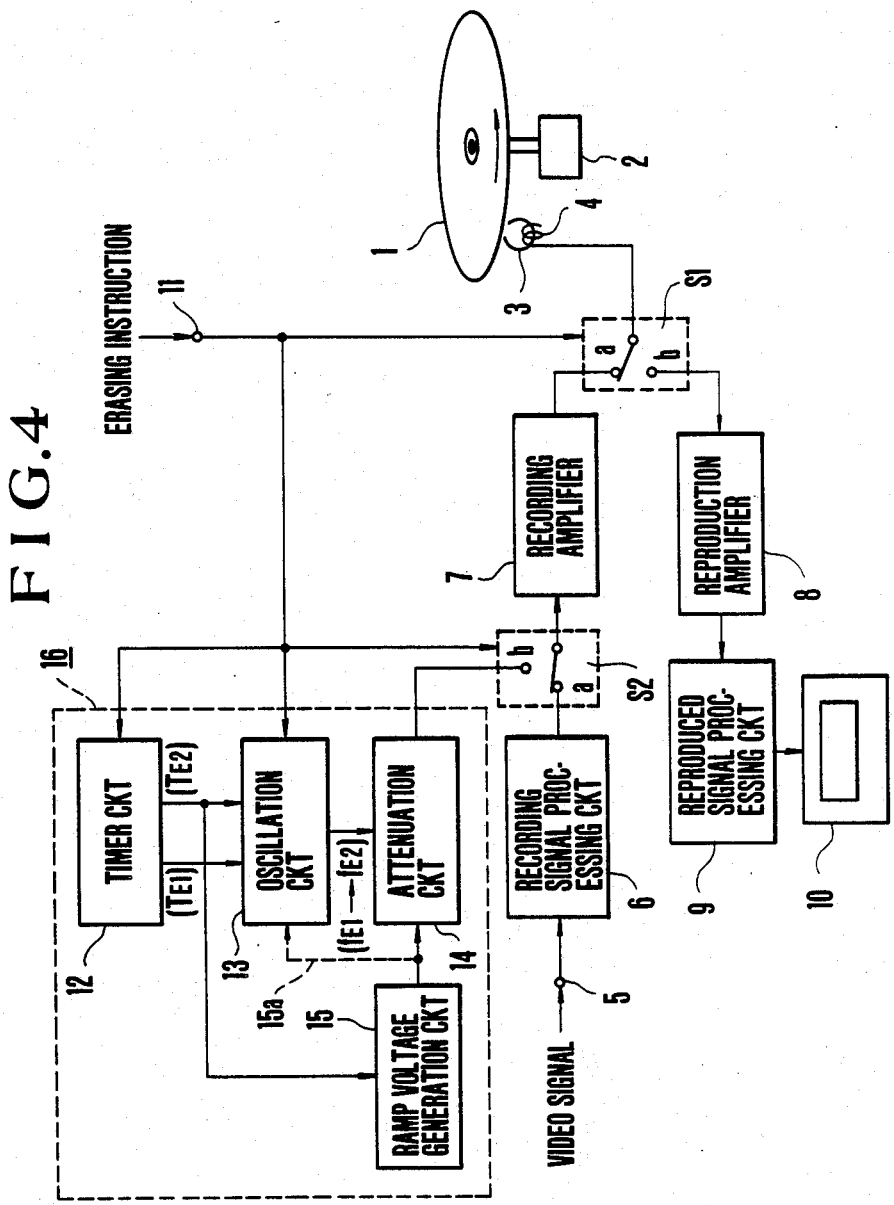
FIG. 4 is a block diagram of an erasing apparatus arranged as the first embodiment of the invention.

FIG. 4 shows a specific example of an arrangement of the erasing apparatus arranged as the first embodiment of the invention. In FIG. 4, a reference numeral 1 denotes a magnetic disc used as a recording medium. The illustration of FIG. 4 includes a disc rotating motor 2; a recording and/or reproducing and erasing head 3 which is shown as an example of a magnetic head; a recording and/or reproducing coil 4 of the head 3; an input terminal 5 for receiving a recording signal such as a video signal; a recording signal processing circuit 6; a recording amplifier 7; a reproduction amplifier 8; a reproduced signal processing circuit 9; a display device 10; a recording and reproduction change-over switch S1; and a recording and erasing change-over switch S2. In a recording mode, the change-over switches S1 and S2 are respectively shifted to their terminals "a" by an operation on a recording operation means (notshown). Then, the signal such as a video signal supplied via the input terminal 5 is transferred via the recording signal processing circuit 6 and the recording amplifier 7 to the coil 4. The signal is recorded on the magnetic disc 1 through the magnetic head 3. In a reproducing mode, the change-over switch S1 is shifted to another terminal "b" by an operation on reproducing operation means (not shown). A signal such as a video signal recorded on the magnetic disc 1 is picked up through the magnetic head 3 and its coil 4 and is supplied via the reproduction amplifier 8 and the reproduced signal processing circuit 9 to the display device 10. The display device 10 then displays a visible image. The output of the reproduced signal processing circuit 9 may be handled by some other output device.

FIG. 4 further shows an erasing signal generating circuit and related devices, which are arranged as follows: An input terminal 11 is arranged to receive an erasing instruction signal. An essensial part of the erasing signal generating circuit 16 includes a timer circuit 12; an oscillation circuit 13; an attenuation circuit 14; and a ramp voltage generation circuit 15. When an erasing instruction signal is supplied to the input terminal 11, the switch S1 is shifted to the terminal "a" while the other switch S2 is shifted to the terminal "b". Also the timer circuit 12 and the oscillation circuit 13 are triggered to begin to operate. The timer circuit 12 counts the time for the above-stated sustained oscillation period TE2 and applies signals representing these time periods to the oscillation circuit 13. Of the outputs of the timer circuit 12, the output representing the period TE2 is supplied also to the ramp voltage generation circuit 15 to cause the circuit 15 to produce a lamp voltage which gradually increases during the period TE2. The oscillation circuit 13 produces an oscillation of the above-stated frequency fE1 during the period TE1. Then, during the period TE2, the oscillation circuit 13 either produces an oscillation of the above-stated frequency fE2 or produces an oscillation of frequency which gradually increases from fE1. For producing the oscillation of the frequency which gradually increases from fE1, the oscillation circuit 13 is arranged, for example, to vary its oscillation frequency with a control voltage. In that case, the voltage produced by the ramp voltage generation circuit 15 is utilized as the control voltage as indicated by a broken line 15a in FIG. 4. The attenuation circuit 14 may include, for example, a voltage control type amplitude modulator which, in response to the voltage produced from the ramp voltage generation circuit 15, modulates the amplitude of the oscillation output of the oscillation circuit 13 such that the envelope of oscillation corresponds to that shown in FIG. 1. Since the ramp voltage is zero during the above-stated period TE1, the output of the oscillation circuit 13 is not attenuated during this period. However, during the period TE2, the output of the oscillation circuit 13 is gradually attenuated until it finally becomes zero as the ramp voltage gradually increases during that period. Where the input recording signal is a video signal, the recording amplifier 7 can be arranged to be usable for both the video signal and the erasing signal as long as the erasing signal is not lower than 3 KHz or thereabout. However, if the frequency of the erasing signal is lower than that, the embodiment may be preferably provided with another amplifier specially for the erasing signal.

With the embodiment arranged as described above, the erasing signal generation circuit 16 produces an erasing signal as shown in FIG. 1(a) or 1(b) in response to the erasing instruction signal applied to the input terminal 11. The erasing signal thus produced is supplied via the recording amplifier 7 to the coil 4 of the magnetic head 3. Then, an erasing operation is accomplished on each individual recording track of the magnetic disc 1 with the advantage described in the foregoing with reference to FIG. 1.

Figure 5:
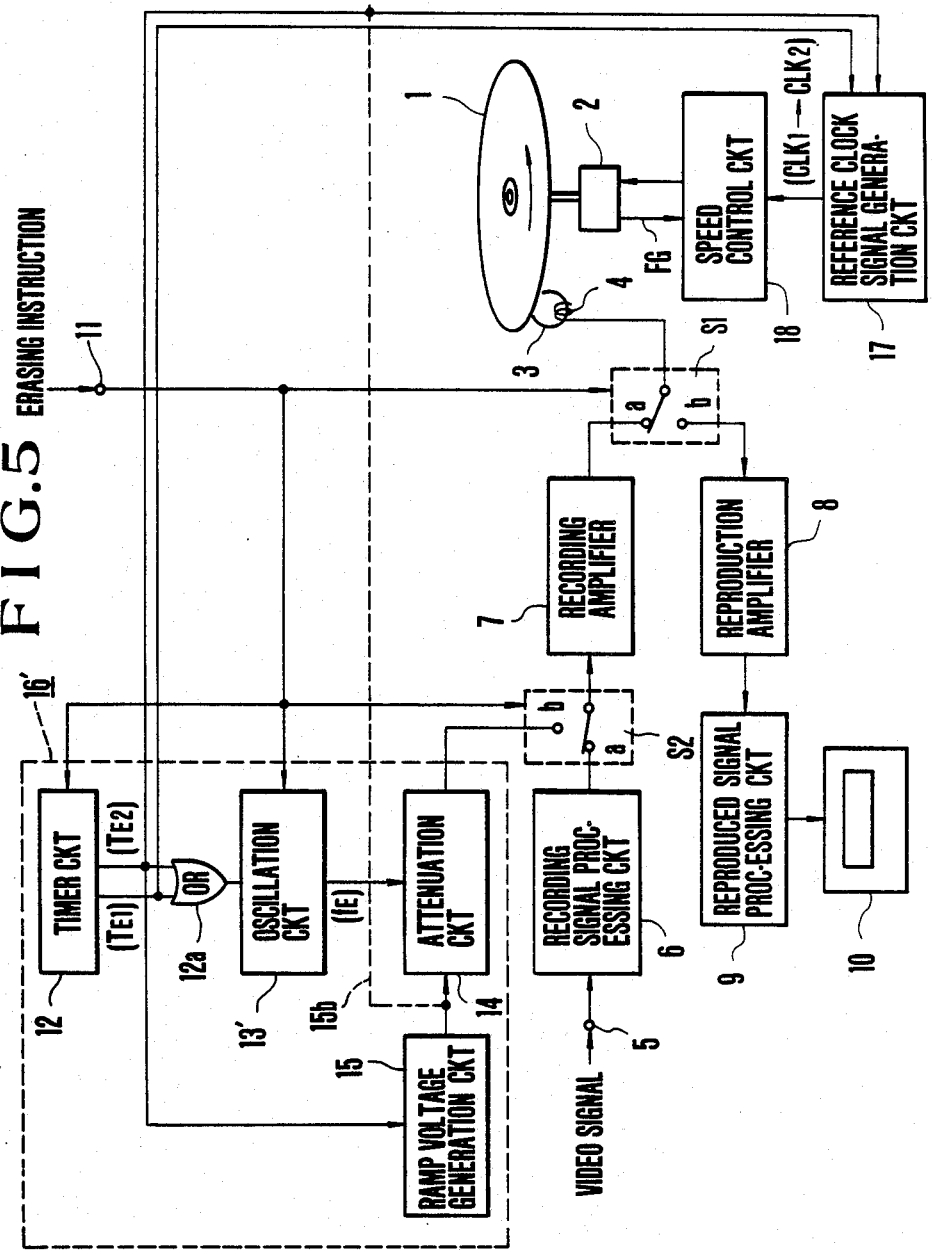
FIG. 5 is a block diagram showing an erasing apparatus arranged as the second embodiment of the invention.

FIG. 5 shows a specific example of an arrangement of the second embodiment of the invention. In FIG. 5, reference numerals and symbols which are the same as those used in FIG. 4 indicate parts that are arranged and function in basically the same manner as the corresponding parts of FIG. 4. A main point of difference of the apparatus of FIG. 5 from that of FIG. 4 lies in means for varying the speed of the disc rotating motor 2. Such speed varying means are an example of means for vary the relative speed of the magnetic head and the recording medium. In this case, the speed varying means includes a reference clock signal generating circuit 17, a speed control circuit 18 and means for controlling the reference clock signal generating circuit 17 according to the output of the timer circuit 12. The reference clock signal generating circuit 17 is arranged to produce a reference clock signal of frequency CLK1 while the timer circuit 12 is counting the period TE1. When the timer circuit 12 begins to count the period TE2, the reference clock signal generating circuit 17 either shifts the frequency of the reference clock signal to a frequency CLK2 (CLK2 <CLK1) or produces a reference clock signal whose frequency is arranged, for example, to be gradually lowered by voltage control. Assuming that the frequency of the reference clock signal which is gradually lowered is comprehensively expressed as CLK'2, the frequency CLK'2 may be lower than the frequency CLK2. The reference clock signal generating circuit 17 may be arranged to produce the reference clock signal whose frequency gradually drops during the period TE2. This drop occurs in the following manner: As shown by a broken line 15b, a lamp voltage produced from the ramp voltage generation circuit 15 is arranged to be applied to the reference clock signal generating circuit 17 during the period TE2 counted by the timer circuit 12. In this case, the circuit 17 may include a voltage control type oscillator which is arranged to have its oscillation frequency gradually lowered as the ramp voltage increases. The reference clock signal produced from the circuit 17 is supplied to the speed control circuit 18. The speed control circuit 18 then controls the rotational speed of the disc rotating motor 2 to change the speed VE1 during the period TE1 to the speed VE2 or V'E2 during the period TE2 as is explained with respect to FIG. 2. More specifically, the speed control circuit 18 controls the motor 2 such that the frequency of the output of a frequency generator which produces a frequency signal FG corresponding to the number of revolutions of the motor 2 follows the frequency of the reference clock signal produced by the reference clock signal generating circuit 17.

The erasing signal generating circuit 16' and its component elements shown in FIG. 5 are arranged to be basically the same as those shown in FIG. 4. However, they differ in detail as follows: In of the second embodiment, the oscillation circuit 13' is arranged to produce a constant frequency fE throughout the two periods TE1 and TE2 in response to the output of an OR circuit 12a which is arranged to receive both of two outputs of the timer circuit 12. The attenuation circuit 14 is arranged to attenuate the oscillation of the frequency fE during the period TE2. In case the frequency of the erasing signal for the attenuating oscillation period TE2 is arranged to change from the frequency for the sustained oscillation period TE1, or the frequency is arranged to be gradually increased during the period TE2, the circuit arrangement must be similar to the arrangement shown in FIG. 4.

With the erasing signal generating circuit 16' arranged as described above, the circuit 16' generates an erasing signal in response to an erasing instruction signal applied to the input terminal 11. The erasing signal thus produced is arranged either to have a constant frequency fE throughout the sustained oscillation period TE1 and the ensuing attenuating oscillation period TE2 or to have a higher frequency fE2 during the period TE2 than a frequency fE1 of the period TE1, or to have a frequency f'E2 which gradually increases during the period TE2. The erasing signal thus produced is supplied via the recording amplifier 7 to the coil 4 of the head 3. Meanwhile, the rotating speed of the disc rotating motor 2 changes from the speed VE1 of the period TE1 to another speed VE2 or V'E2 for the period TE2. This causes the recorded wave length on the magnetic disc 1 to change in an equivalent manner, from the wave length λE1 during the period TE1 to the wave length λE2 during the period TE2 or to the wave length λ'E2 during the period T'E2 (or to a value influenced by a change effected in the frequency of the erasing signal during these periods). As a result, erasing action is carried out with the advantage described in the foregoing with reference to FIG. 2.

Figure 6:
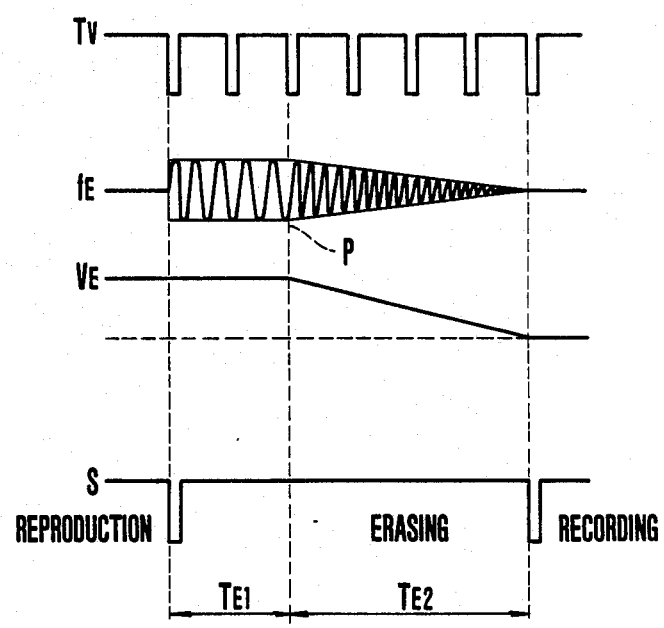
FIG. 6 is a chart showing the operation of a modification of the erasing apparatuses shown in FIGS. 4 and 5.

FIG. 6 shows the operation of a modification of the erasing apparatuses shown in FIGS. 4 and 5. In this case, the timing of the above-stated sustained oscillation period TE1 and the ensuing attenuating oscillation period TE2 is arranged to be synchronized with a vertical synchronizing signal TV included in a video signal supplied to the input terminal 5. This arrangement enables these periods and their sum period to be adjustable as desired according to the period of the vertical synchronizing signal TV. In FIG. 6, a reference symbol fE indicates a mode in which the frequency of the erasing signal is arranged to be gradually increased after a point P. A symbol VE indicates a mode in which the relative speed between the magnetic head 3 and the magnetic disc 1 is arranged to be gradually lowered after the point P. Further, in another possible mode S, a sequential operation of reproduction—erasing—recording can be accomplished according to pulses arranged on the basis of the synchronizing signal TV.

Further, in order to have the periods TE1 and TE2 determined on the basis of the vertical synchronizing signal TV, the timer circuit 12 of FIGS. 4 and 5 is arranged to be a digital timer including a digital counter. The vertical synchronizing signal TV is separated and taken out by a synchronizing signal separation circuit from a composite video signal supplied to the input terminal 5. The synchronizing signal TV thus separated is applied to the above-stated digital counter to cause the counter to perform a counting operation on the basis of the synchronizing signal TV.

While the present invention has been described in preferred embodiments thereof, the application of the invention is not limited to these cases where a magnetic disc is employed as the recording medium. The invention is likewise applicable to other cases where the recording medium is, for example, a magnetic tape or where the erasing signal is arranged to be supplied to an erasing coil which is independently arranged at a recording or reproducing head or to be supplied to an erasing head discretely arranged.

What we claim:

1. An erasing apparatus for erasing a recorded signal from a selected one of tracks of a magnetic medium, said recorded signal having a predetermined frequency range, and said apparatus comprising:
    (a) a magnetic head;
    (b) positioning means for positioning said magnetic head relative to said selected track of the medium;
    (c) erasing signal supply means for supplying said magnetic head with A.C. erasing signal, said erasing signal having a frequency lower that those within said predetermined frequency range of the recorded signal and including a first signal portion with a constant amplitude and a second signal portion with a gradually decreasing amplitude;
    (d) drive means for relatively moving said magnetic medium and said magnetic head; and
    (e) control means for controlling said drive means and causing the drive means to relatively move said magnetic medium and said magnetic head at a relative speed during the time said erasing signal supply means is supplying the head with said first signal portion and causing the drive means to lower the speed of the relative movement between the medium and the head during the time the supply means is supplying the head with said second signal portion.

2. The apparatus according to claim 1, wherein said control means is arranged to cause said drive means to relatively move said medium and said head at a first constant relative speed during the time said supply means is supplying the head with said first signal portion and to cause the drive means to relatively move the medium and the head at a second constant relative speed during the time the supply means is supplying the head with said second signal portion, said second speed being lower than said first speed.

3. The apparatus according to claim 1, wherein said control means is arranged to cause said drive means to gradually decrease the speed of the relative movement between said medium and said head during said supply means is supplying said head with said second signal portion.

4. The apparatus according to claim 1, wherein said magnetic medium is of a rotating type and said drive means is arranged to rotate said magnetic medium relative to said magnetic head.

5. In a magnetic recording and reproducing system in which a recorded signal is reproduced from a magnetic medium and the reproduced signal has a predetermined frequency range, an erasing apparatus for erasing the recorded signal from the medium, comprising:
    (a) a magnetic head;
    (b) drive means for relatively moving said magnetic medium and said magnetic head;
    (c) erasing signal supply means for supplying said magnetic head with an A.C. erasing signal, said erasing signal having a frequency lower than those within said predetermined frequency range of the reproduced signal and including a first signal portion with a constant amplitude and a second signal portion with a time-dependent decreasing amplitude; and
    (d) control means for controlling said drive means so that a speed of the relative movement between said magnetic medium and said magnetic head effected by the drive means during the time said erasing signal supply means is supplying the head with said second signal portion becomes lower than that of the relative movement between the medium and the head effected by the drive means during the time the supply means is supplying the head with said first signal portion.

6. The apparatus according to claim 5, wherein said control means is arranged to cause said drive means to relatively move said medium and said head at a first constant relative speed during said supply means is supplying the head with said first signal portion and to cause the drive means to relatively move the medium and the head at a second constant relative speed during the supply means is supplying the head with said second signal portion, said second speed being lower than said first speed.

7. The apparatus according to claim 5, wherein said control means is arranged to cause said drive means to gradually decrease the speed of the relative movement between said medium and said head during said supply means is supplying said head with said second signal portion.

8. The apparatus according to claim 5, wherein said magnetic medium is of a rotating type and said drive means is arranged to rotate said magnetic medium relative to said magnetic head.

9. The apparatus according to claim 5, wherein said magnetic medium has a plurality of tracks each recorded with a signal, and the apparatus further comprising:

positioning means for positioning said magnetic head relative to a selected one of the tracks of the magnetic medium for erasing the recorded signal from the selected track.

10. A method of erasing a recorded signal from a magnetic medium, said recorded signal having a predetermined reproducible frequency range, and said method comprising the steps of:
    (a) confronting a magnetic head with the magnetic medium;
    (b) relatively moving the medium and the head at a relative speed and supplying the magnetic head with a first A.C. signal having a constant amplitude and a frequency lower than those within said predetermined reproducible frequency range of the recorded signal; and
    (c) lowering said relative speed and supplying the magnetic head with a second A.C. signal having a time-dependent decreasing amplitude.

11. The method according to claim 10, wherein said second A.C. signal has a frequency equal to that of said first A.C. signal.

12. The method according to claim 10, wherein said second A.C. signal has a time-dependent increasing frequency.

13. The method according to claim 12, wherein said time-dependent increasing frequency has a maximum frequency higher than that of said first A.C. signal.

14. The method according to claim 10, wherein said lowering of the relative speed includes changing of the relative speed from a higher constant speed to a lower constant speed.

15. The method according to claim 20, wherein said lowering of the relative speed includes time-dependent decreasing of the relative speed to a predetermined lower speed.

16. The method according to claim 10, wherein said magnetic medium has a plurality of tracks each recorded with a signal, and the method further comprising the step of:

positioning said magnetic head relative to a selected one of the tracks of the magnetic medium before supplying the head with said first A.C. signal.

17. A method of erasing a recorded signal from a rotary type magnetic medium, comprising the steps of:
    (a) confronting a magnetic head with the magnetic medium and rotating the medium relative to the head; and
    (b) successively supplying the magnetic head with a first and a second A.C. signals while changing the rotation speed of the magnetic medium, said first and second signals having different amplitude characteristics.

18. The method according to claim 17, wherein said changing of the rotation speed of the magnetic medium includes lowering of the rotation speed between a first state where the head is supplied with said first A.C. signal and a second state where the head is supplied with said second A.C. signal.

19. The method according to claim 18, wherein said lowering of the rotation speed includes changing of the rotation speed from a higher constant speed to a lower constant speed.

20. The method according to claim 18, wherein said lowering of the rotation speed includes time-dependent decreasing of the rotation speed to a predetermined lower speed.

21. The method according to claim 18, wherein said first A.C. signal has a predetermined frequency to that of said first A.C. signal includes afrequency equal to that of said first A.C. signal; said first A.C. signal having a constant amplitude and said second A.C. signal having af time-dependent decreasing amplitude.

22. The method according to claim 21, wherein said second A.C. signal has a constant frequency equal to that of said first A.C. signal.

23. The method according to claim 21, wherein said second A.C. signal has a time-dependent increasing frequency having a minimum frequency equal to that of said first A.C. signal.

* * * * *